April 26, 1927.
P. L. SCOTT
1,626,053
GOVERNING DEVICE FOR INTERNAL COMBUSTION MOTORS
Filed July 5, 1919
4 Sheets-Sheet 3
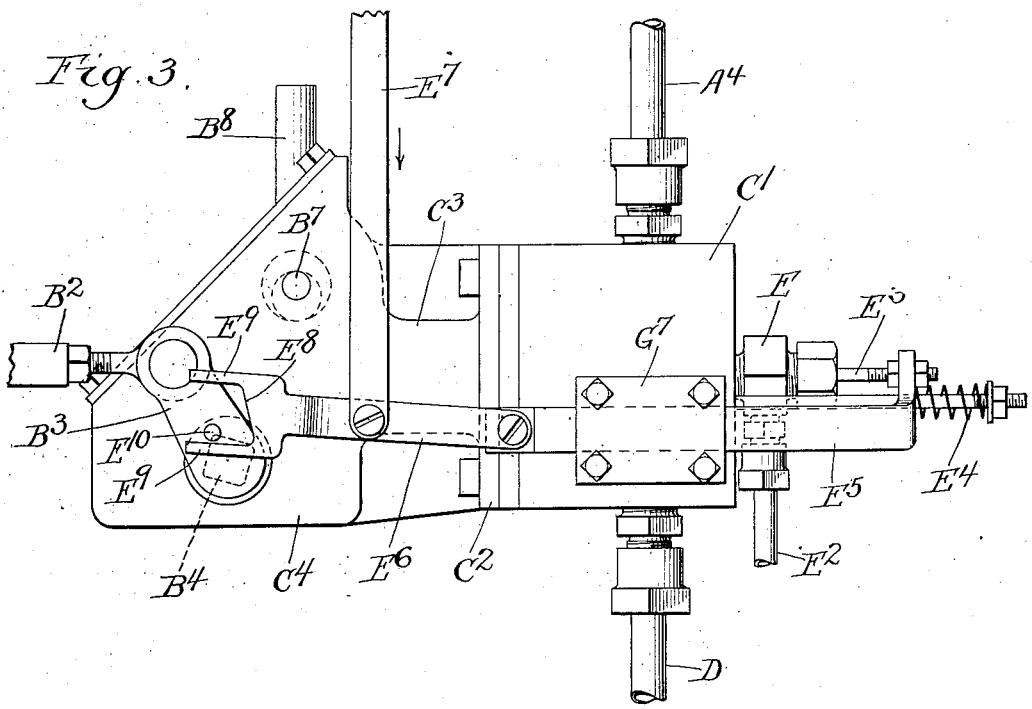
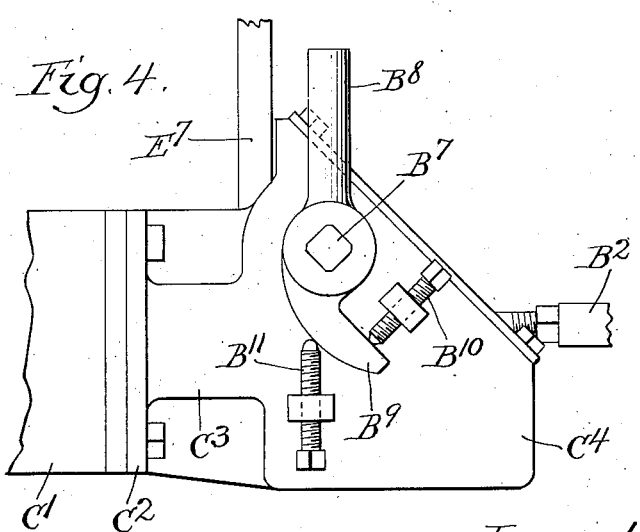
Witness.
Edward T. Wray.
Inventor
Philip L. Scott
by Parker and Carter
Attorneys

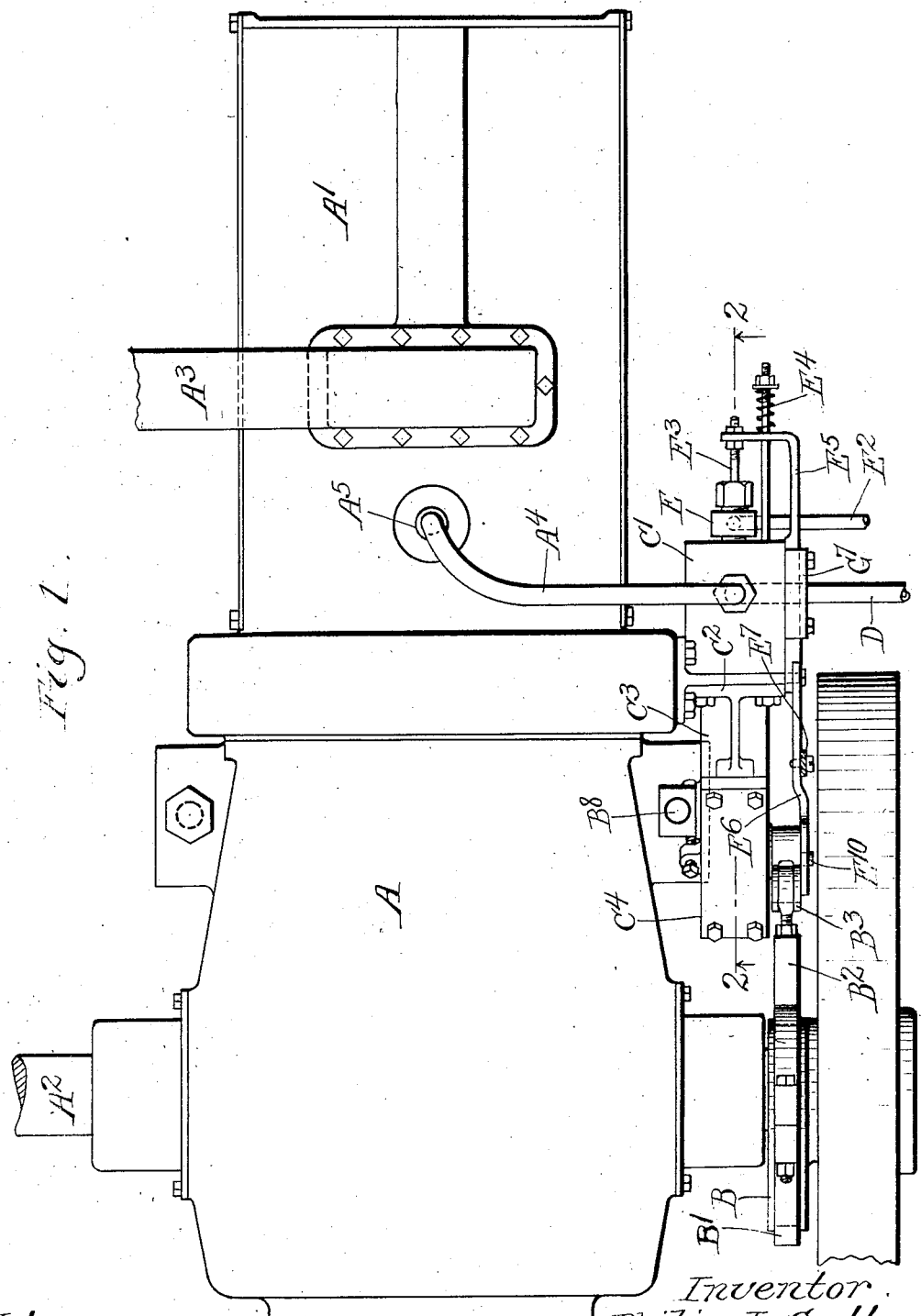

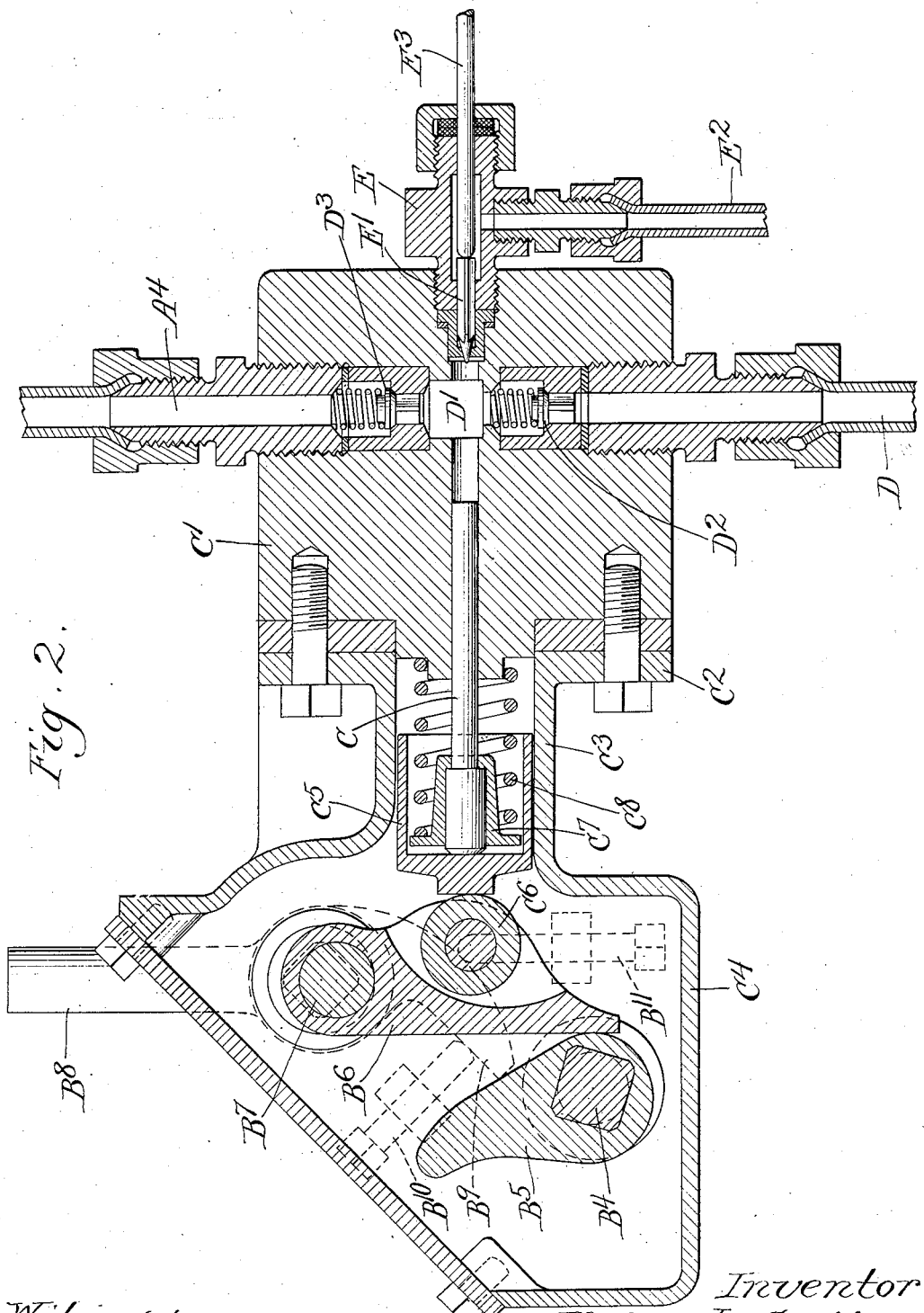

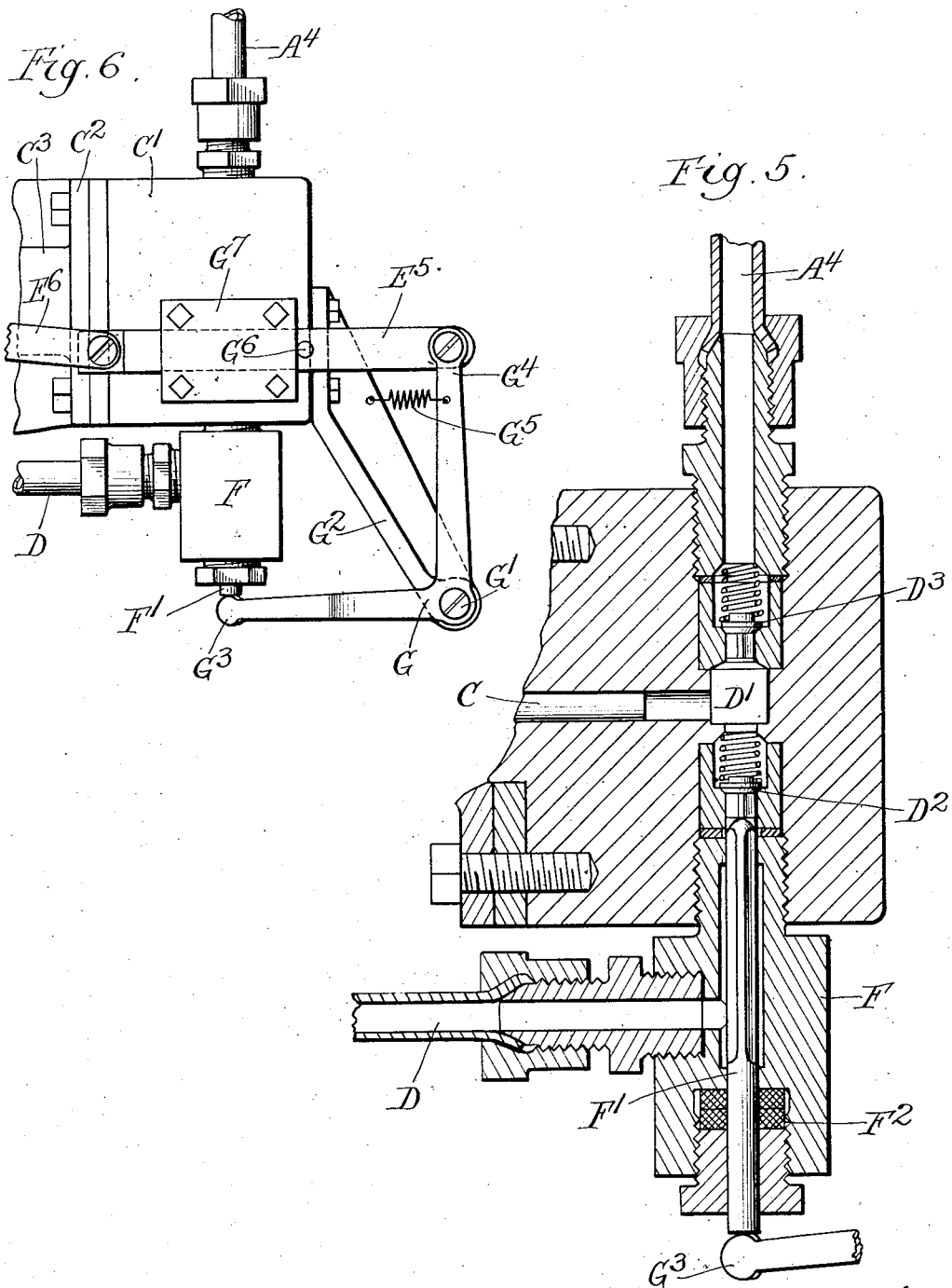

Patented Apr. 26, 1927.

1,626,053

UNITED STATES PATENT OFFICE.

PHILIP L. SCOTT, OF THREE OAKS, MICHIGAN, ASSIGNOR TO SUPER DIESEL TRACTOR CORPORATION, OF LA PORTE, INDIANA, A CORPORATION OF NEW YORK.

GOVERNING DEVICE FOR INTERNAL-COMBUSTION MOTORS.

Application filed July 5, 1919. Serial No. 308,876.

In connection with engines which operate by the direct injection of a solid liquid fuel into a combustion chamber, great difficulty has been, in the past, encountered in connection with governing because the governors of the past have not only varied the supply of fuel, but also the angle of advance, at a given speed in an effort to control the operation of the engine and maintain the speed constant under varying loads.

It will be remembered, of course, that there is for any engine, and any fuel, and any speed, a certain fixed preferable best angle of advance. To change the speed, the design of the engine, or the fuel, you will have to change the angle of advance to insure the best possible results, and if in the effort to control the supply of liquid fuel injected into the cylinder and thus govern by controlling the speed of the engine to maintain it constant, you actually vary the angle of advance and immediately get away from the best condition of operation.

In my invention, therefore, I propose to provide a governor which will maintain the speed of the engine constant under varying loads by changing the amount of liquid fuel injected for each stroke, and will, at the same time, maintain a constant or fixed angle of advance whereby the ignition which tends to take place is always at the same angular position of the crank shaft.

By my invention, therefore, I provide means for injecting liquid fuel without the admixture of any spraying medium and so arrange the apparatus that the commencement of the injection will always occur at the same angular position in the crank shaft, but the pressure which forces the solid liquid into the cylinder will be suddenly cut off at a varying angular position of the crank shaft whereby the amount of liquid fed in during the latter portion of each stroke may be varied or controlled in order to govern the engine speed.

Clearly, of course other means for varying the total amount of fuel fed by cutting off or stopping the feed progressively as the load goes down from the latter end of the stroke, might be involved.

Of course, also, if my invention is applied to a variable speed engine as for instance, the automobile engine, it might then be desirable to change the angle of advance but that would have nothing to do with governing except that you would have to move the whole time cycle or the whole injection angle backward or forward to preserve the same governing time or angular interval between the angular position when injection commences, and the angle of cut-off where injection is cut off. The apparatus might be provided to be controlled by the governor for changing the angle of advance to fit different speed conditions or apparatuses otherwise controlled might be used. One way in which this could be done would be to provide the usual hand control for varying the governor to fit a different speed and simultaneously varying the angle of advance, but since this forms no part of the governing function, and since I am at present, concerning myself with governing only, I have not thought it worth while to go into a discussion of any such apparatus.

My invention comprises means for governing by beginning the feed of fluid fuel at a fixed angle of advance for a given speed without control of the governor and then regulating by the governor the total amount of such fuel feed either by stopping or cutting off the flow of fuel progressively from the latter end of the stroke, in proportion as the load decreases or by varying the rate of feed.

In other words, my invention consists of a method of governing which leaves the angle of advance and reduced the total quantity of fuel fed through, by reducing the rate of feed or by stopping and cutting off progressively the fuel feed from the latter end of the stroke as the load decreased.

My invention is illustrated in the accompanying drawings, wherein—

Figure 1 is a plan view of a single cylinder double piston engine to which my device is applied;

Figure 2 is a vertical section along the line 2—2 of Figure 1;

Figure 3 is a side elevation of my invention separate from the engine;

Figure 4 is an elevation on opposite side showing the part of my invention;

Figure 5 is a detail section of a modified form;

Figure 6 is a side elevation of the form shown in Figure 5.

Like parts are indicated by like characters throughout.

A is an engine. It has an engine cylinder $A^1$, a crank shaft $A^2$, there is an exhaust pipe $A^3$ leading from it, and a fuel supply line $A^4$ leading to it and communicating with a spray nozzle $A^5$, so that fuel forced through this supply line may be discharged or sprayed into the engine cylinder.

B is an eccentric on the crank shaft, which is surrounded by an eccentric strap $B^1$ which drives an eccentric rod $B^2$. This rod is pivoted to the crank arm $B^3$ on the cam shaft $B^4$. $B^5$ is a cam rigidly mounted on the cam shaft. The cam $B^5$ is adapted to engage the flat surface of the cam $B^6$ which cam is pivoted on an eccentric pin $B^7$ which may be adjustably controlled to change the axis of rotation of the cam $B^6$ by the manipulation of a hand lever $B^8$ whereby the angle of advance may be manually changed. $B^9$ is an adjusting foot associated with the lever $B^8$ which is adapted to engage the set screws $B^{10}$ $B^{11}$ whereby the parts may be locked in position to give a fixed angle of advance.

C is the pump plunger which reciprocates in a pump block $C^1$, which block is bolted onto the flange $C^2$ on the cylinder $C^3$ projecting from the housing $C^4$. $C^5$ is a cross head mounted for reciprocation. This cross head is engaged at one end by a roller $C^6$ on the cam $B^6$ and it is hollow and contains the outer end of the pump plunger which, at that outer end, is rigidly fastened on a spring retainer $C^7$. $C^8$ is a spring interposed between the flange on the spring retainer and the end block.

D is a suction line leading to the fuel supply and discharging into the pressure chamber $D^1$ through a spring seated check valve $D^2$. The fuel supply line $A^4$ leads from the pressure chamber $D^1$, having interposed between it and the pressure chamber, the spring seated check valve $D^3$. These spring check valves are merely the ordinary type of valve having flanges to center them in the valve seats.

E is a pressure release valve housing screw-threaded into the end of the pump block. It contains a needle valve $E^1$ which controls a pressure release port associated with a pressure chamber $D^1$ whereby, when the needle valve is permitted to leave its seat, the pressure may escape through the over-flow pipe $E^2$ back to the reservoir. $E^3$ is a valve rod engaging the end of the needle valve $E^1$ and held firmly thereagainst by a spring $E^4$ sufficiently powerful to seat the valve against any of the working pressures which may develop in the injection system. $E^5$ is a sliding bar rigidly attached to the end of the member $E^3$ and engaged by the spring $E^4$ whereby the valve is kept seated. $E^6$ is a cam lever pivoted on the end of the rod $E^5$ adapted to move up and down by a link $E^7$ leading to and controlled by the governor. This cam lever $E^6$ has at its end, an inclined cam member $E^8$, thicker above and thinner below, and terminating in forks $E^9$. This cam is adapted to be engaged by a release pin $E^{10}$ mounted on the crank arm $B^3$ and the position of this cam is controlled by the governor which controls the point at the rotation of the crank shaft at which the cam is struck by the pin and the release valve released. In the modified form as shown in Figure 5, the oil pipe D leads off from the side of the terminal housing F so that a striker rod $F^1$ may pass in through a packing gland $F^2$ and engage the under side of the check valve $D^2$. This striker rod $F^1$ is the equivalent of the member $E^3$ and when this modified form is used, instead of having a spring seating a release valve and compressing the spring to release the valve, we have the mechanism strike the check valve to unseat it and cause it to work sometimes as a check valve and sometimes as a release valve. This is accomplished by the following mechanism:

G is a bell crank lever pivotally mounted at $G^1$ on the bracket $G^2$. The bell crank lever has one arm end $G^3$ which strikes the lower end of the striker rod $F^1$ and another end $G^4$ which is pivotally attached to the sliding bar $E^5$. A short spiral spring $G^5$ attached at one end to the bracket $G^2$ and at the other to the bell crank lever G, serves to bring the parts to the position in which the pin $G^6$ engages a guide block $G^7$ on the pump casting C and thus holding the parts in the position shown in Figure 6.

Although I have shown in my drawings an operative device, still many changes might be made in design, arrangement of parts, and shape without departing materially from the spirit of my invention, and I wish therefore, that my drawings may be regarded as in a sense, diagrammatic.

The use and operation of my invention are as follows:

As the crank shaft rotates, it drives the eccentric and the eccentric in turn through its eccentric rod oscillates the cam drive lever. The cam, as it oscillates causes a reciprocation of the pump plunger and this pump plunger making one full reciprocation for each stroke of the engine, will suck up out of the reservoir and discharge into the engine cylinder, a certain amount of fuel on each reciprocation. If this pump is left alone, it will discharge exactly the same amount of fuel into the cylinder each time and since there is a fixed relation between the speed of the plunger piston and the engine speed, there is a fixed relation between the piston speed and the amount of fuel injected up to any angular position of the piston.

There is a relief valve associated with the chamber in which the pump plunger works and this relief valve is normally closed by a spring. The governing is affected by an apparatus which opens the relief valve against the pressure of the spring in varying angular positions of the crank shaft, that is, it varies the cut off because, as soon as the relief valve is cracked open at all, it is larger than the spray nozzle and affords less resistance than the spray nozzle and so immediately, all injection of fuel into the combustion chamber ceases.

This relief valve is opened at varying times or varying angular positions to the crank shaft by a pin on the cam drive lever which pin strikes a cam surface on the end of the lever which is moved up and down by the governor. As the speed rises the lever is moved by the governor so as to bring the broader portion of the cam into the path of the striker pin thus insuring an earlier cut off, and as the speed falls the governor moves a thinner portion of the cam into the path of the striker pin thus allowing the oscillating pin to travel further before it strikes the cam and releases the pressure. The operation of different adjusting means for positioning the parts and for controlling the initial set up of the apparatus is, of course, important but equally obviously, other schemes might be employed.

I have shown the means for releasing the pressure in one case a separate relief valve, in another case, it takes the form of a striker pin which unseats the suction valve.

Any engine in which a wide speed range is desirable either manually or automatically, means connected with the governor may be provided for changing the angle of advance to correspond with the desired rotation speed. Once set for a new speed, the governor will act without affecting said angle of advance.

I claim:

1. In an internal combustion engine a governing apparatus comprising means for beginning the injection of fuel at a fixed point in the engine cycle and for continuing such injection during a part of the cycle which is variable in length in response to variations in the load, said means comprising a fuel pump and an automatic relief valve and mechanical means for freeing said valve to permit its automatic movement in response to pressure in the pump cylinder and governor controlled means for controlling the operation of the relief valve, the operation of the relief valve being independent of the motion of the pump plunger.

2. A fuel pump, a control mechanism adapted to be used in injection systems for internal combustion engines and the like comprising a pump barrel, a plunger, a suction valve, a discharge valve, an independent outwardly opening positively seated needle relief valve, all of said valves operated automatically, the suction and discharge valves in response to pump plunger motion, the relief valve only in response to pressure in the pump cylinder when freed by the control linkage to cause discharge from the pump barrel to the fuel valve to cease as required by the engine, load and speed.

3. A fuel pump, a control mechanism adapted to be used in injection systems for internal combustion engines and the like comprising a pump barrel, a plunger, a suction valve, a discharge valve, an independent needle relief valve, all of said valves operated automatically, the suction and discharge valves in response to pump plunger motion, the relief valve only in response to pressure in the pump cylinder when freed by the control linkage to cause discharge from the pump barrel to the fuel valve to cease as required by the engine, load and speed.

In testimony whereof, I affix my signature this 25th day of June, 1919.

PHILIP L. SCOTT.